United States Patent [19]

Scheppele

[11] 4,219,132
[45] Aug. 26, 1980

[54] APPARATUS FOR METERING PARTICULATE MATERIAL

[75] Inventor: Lyle W. Scheppele, Dubuque, Iowa

[73] Assignee: Toledo Stamping & Manufacturing Company, Toledo, Ohio

[21] Appl. No.: 874,136

[22] Filed: Feb. 1, 1978

[51] Int. Cl.² .................................................. G01F 13/00
[52] U.S. Cl. ........................................ 222/16; 222/38; 222/504; 222/505; 200/61.21; 267/73; 318/470
[58] Field of Search .................. 222/38, 333, 504, 505; 222/16; 267/74, 73, 68; 200/61.21; 318/470

[56] References Cited

U.S. PATENT DOCUMENTS

| | | | |
|---|---|---|---|
| 2,349,519 | 5/1944 | Reichenstein | 200/61.21 |
| 3,115,598 | 12/1963 | Ziegler | 318/470 X |
| 3,129,801 | 4/1964 | Heyer | 267/74 X |
| 3,130,358 | 4/1964 | Lang | 318/470 X |
| 3,888,390 | 6/1975 | Grau | 222/38 X |

FOREIGN PATENT DOCUMENTS 314867  10/1918  Fed. Rep. of Germany ........ 200/61.21

*Primary Examiner*—Robert J. Spar
*Assistant Examiner*—Frederick R. Handren
*Attorney, Agent, or Firm*—Allen D. Gutchess, Jr.

[57] ABSTRACT

Apparatus is provided for metering particulate material from a source and transferring it to another location. The metering apparatus is primarily designed to supply a supplement or supplemental component to animal feed to obtain accurate control over the quantity of supplement and uniform distribution of it. The apparatus includes a bin with a gate which can be reciprocated across a discharge opening with the stroke of the gate being variable. The apparatus has an improved drive arrangement and improved controls for regulating the amount of feed which are more reliable and less subject to malfunction than those heretofore known.

5 Claims, 4 Drawing Figures

APPARATUS FOR METERING PARTICULATE MATERIAL

This invention relates to apparatus for metering particulate material and especially supplement for animal feed.

The new metering apparatus incorporates improvements over the metering devices shown in Grau U.S. Pat. Nos. 3,184,108; 3,888,390; and 3,897,888.

The drive for the new metering apparatus includes a motor with a brake which, through a gear box, drives a cam. The cam, in turn, through linkages reciprocates a gate which opens and closes a discharge opening in a bin for the particulate material or supplement. The new metering apparatus is functionally similar in many respects to the first U.S. patent mentioned above, U.S. Pat. No. 3,184,108, but the new drive is more reliable and longer lasting than that employed in that patent. The cam in the drive linkage also operates a limit switch which stops the motor in a predetermined position such that the gate always closes the discharge bin opening when the motor is stopped.

A second cam is employed adjacent the first and, through a second limit switch, actuates a subtraction counter which enables any predetermined number of strokes of the gate to be achieved. By varying the number of strokes and the length of the stroke, substantially any quantity of particulate material or supplement can be provided over any selected amount of time.

The metering apparatus also is equipped with improved bin switches to regulate the material fed to the bin and also to shut off the drive motor if the amount in the bin falls below a quantity sufficient to adequately cover the discharge opening of the bin. The bin switches include microswitches located within containers having diaphragms which seal the containers, but are yieldable when particulate material is pressed against them to actuate the microswitches.

Finally, the drive linkage for the gate includes a yieldable link which is substantially less expensive than those heretofore employed whereby the gate can stop, even though the motor is still driving the linkages, in the event an obstruction is met at the discharge opening.

It is, therefore, a principal object of the invention to provide metering apparatus with an improved drive and controls which are more reliable and less subject to malfunctioning.

Another object of the invention is to provide improved metering apparatus having the features and advantages discussed above.

Many other objects and advantages of the invention will be apparent from the following detailed description of a preferred embodiment thereof, reference being made to the accompanying drawings, in which.

Figure 1:
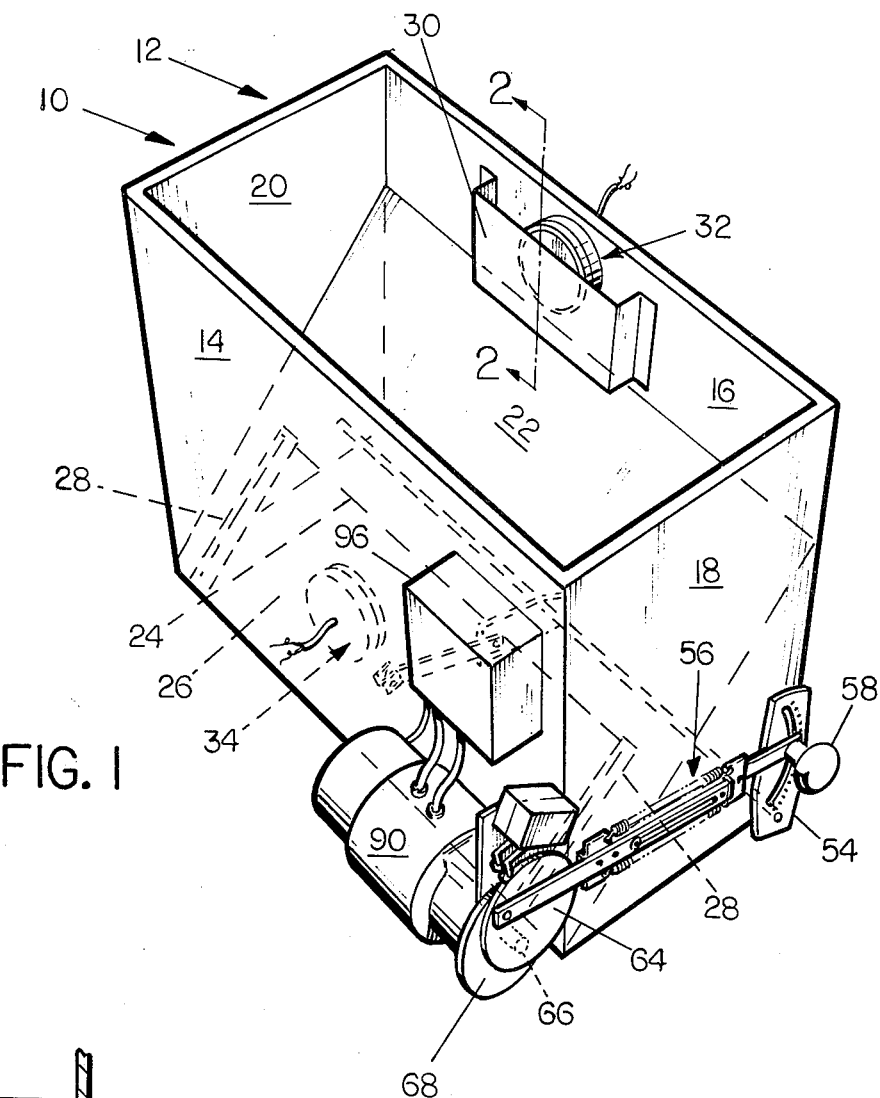
FIG. 1 is an overall view in perspective of metering apparatus embodying the invention.

Referring to the drawings, and particularly to FIG. 1, metering apparatus according to the invention is indicated at 10. Particulate material, especially a feed supplement, is typically supplied to the top of the apparatus and discharged below onto feed carried along a conveyor belt. The apparatus 10 includes a bin 12 having a front wall 14, a rear wall 16, side walls 18 and 20, and a slanted bottom wall 22. The bottom wall 22 has a rectangular discharge opening 24 below which is located a slide gate 26. This reciprocates across the opening 24, being slidably supported by tracks or flanges 28.

The particulate material can be supplied to the bin 12 from an auger or other suitable supply means. When the material is supplied to the bin 12, it also is received back of a fixed baffle 30 and when the space between the baffle 30 and the rear wall 16 is substantially filled, a bin supply switch 32 is operated which shuts off the auger. The supplement remains in the space between the baffle 30 and the rear wall 16 until the supplement in the main part of the bin drops below the lower edge of the baffle 30. At that time, the supplement behind the baffle 30 begins to empty and when it clears the switch 32, the switch again is actuated to operate the auger and repeat the process. Thus, the supply means for the bin 12 operates when the material level therein is slightly below the lower edge of the baffle 30 and is stopped when the level is approximately three-fourths of the distance up the baffle 30.

A lower bin switch 34 is mounted on the front wall 14 to stop the discharge of the particulate material or supplement when the level thereof drops to the lower edge of the bin switch 34. At that time, if the discharge is not stopped, further drop in the level of the supplement will prevent it from fully covering the discharge opening 24 so that the supplement will not be uniformly discharged onto the feed moving therebelow.

Figure 2:
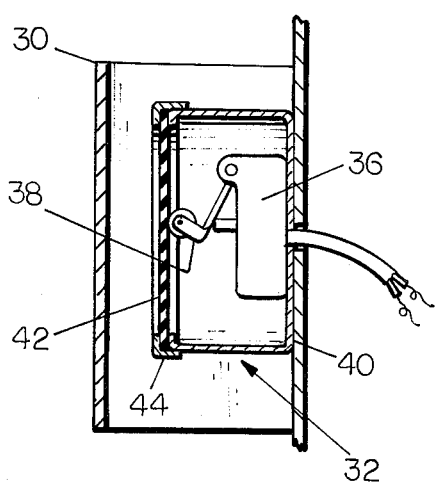
FIG. 2 is a view in transverse cross section taken along the line 2—2 of a bin switch of FIG. 1.

The supply switch 32 and the lower bin switch 34 are identical in construction. As shown in FIG. 2, the switch 32 includes a suitable microswitch 36 having a pivoted feeler arm 38 extending forwardly. The switch 36 is located entirely within a container 40 across the open front of which is a diaphragm 42. This is connected to the container 40 by a peripheral band 44 to seal the container and prevent the switch 36 from being covered with dust or other contaminants and rendered inoperative. Dust or other airborne particles from the supplement or other particulate material can be very much of a nuisance in rendering movable parts inoperative and thus severely reducing the reliability of the metering apparatus 10 unless strong measures are taken to protect such parts, as done with the microswitch 36.

Figure 3:
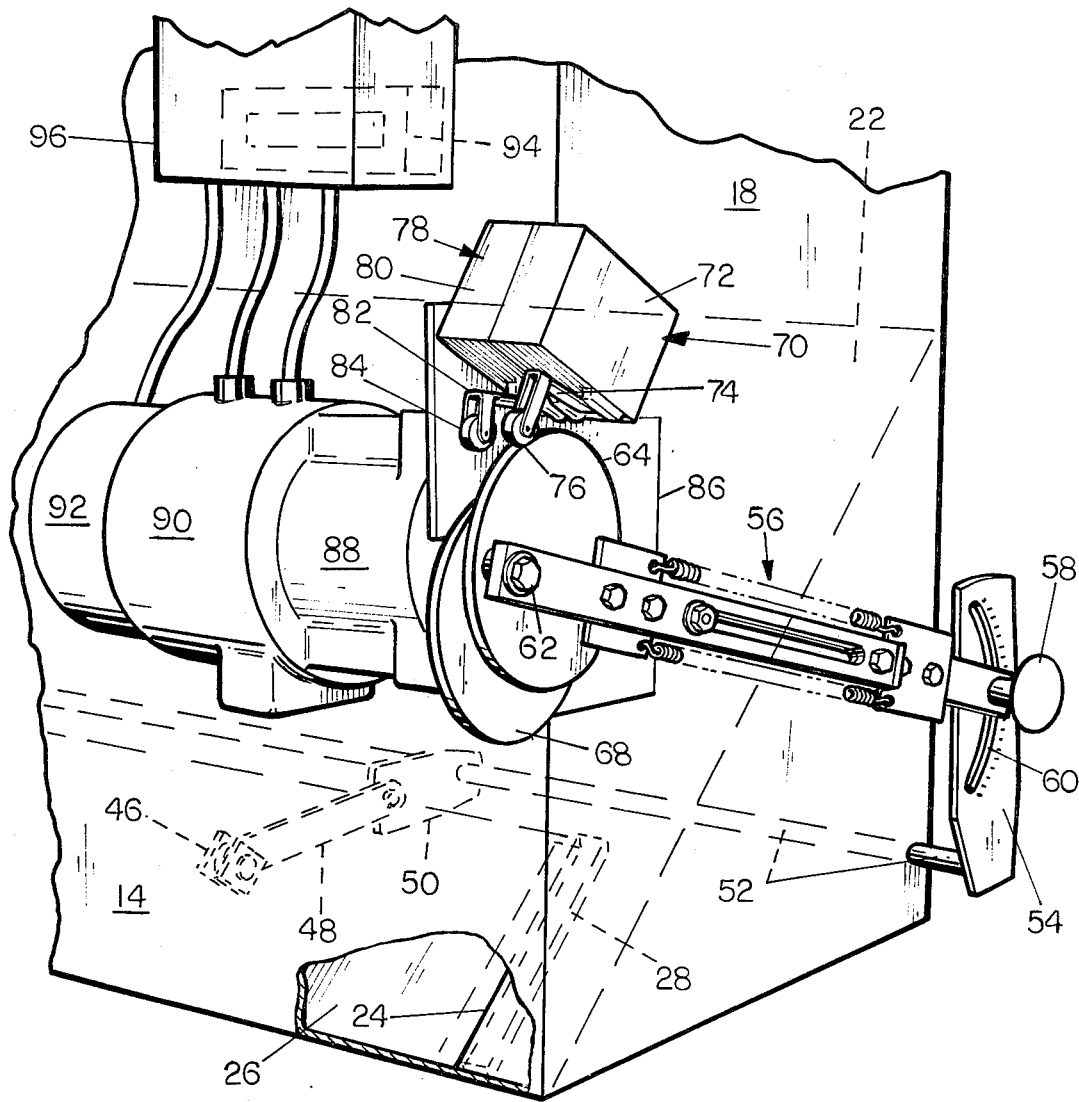
FIG. 3 is an enlarged fragmentary view of the drive for the discharge gate of the metering apparatus and controls therefor.

The drive arrangement for reciprocating the gate 26 will now be discussed with particular reference to FIG. 3. Accordingly, ears or tabs 46 are affixed to the gate 26 and a connecting link 48 is pivotally connected thereto. The link 48 is pivotally connected to a tab 50 which is affixed to a rod 52 pivotally supported by lower portions of the bin side walls 18 and 20. When the rod 52 is oscillated, it causes the gate 26 to open and close. Outside the bin 12, the rod 52 is affixed to a stroke control plate 54. The plate 54 is oscillated through a yieldable link 56 to be discussed in more detail subsequently. The link 56 is pivotally connected to the plate 54 through an adjusting knob 58 which can be loosened and tightened to connect the yieldable link 56 at any position along an arcuate slot 60 in the plate. The link 56 is moved through a fixed distance so that it causes the rod 52 to oscillate through a greater angle to cause the stroke of the gate 26 to be longer when the link 56 is moved downwardly in the slot 60, and vice versa. This stroke adjustment is shown and discussed more fully in the aforesaid U.S. Pat. No. 3,184,108.

The opposite end of the link 56 is pivotally connected by a suitable shoulder bolt 62 or the like to a first cam 64. The stroke of the yieldable link 56 is determined by the extent of the offset of the shoulder bolt 62 from a drive shaft 66 (FIG. 1) connected to the cam 64. A second cam 68 if also affixed to the drive shaft 66 in a manner to be offset from 90° to 180° with respect to the first cam 64. A limit switch 70 is located above the first cam 64 and includes a housing 72 with a feeler arm 74 having a roller 76 below the housing. A second limit switch 78 is located above the second cam 68 and also includes a housing 80 having a feeler arm 82 with a roller 84 below the housing. With both of the limit switches 70 and 78 being located above the cams 64 and 68, the housings 72 and 80 provide dust protection for the pivotal feeler arms 74 and 82 to thereby increase the overall reliability of the metering apparatus 10.

The limit switches 70 and 78 are mounted on a supporting plate or bracket 86 which is adjustably mounted on the side wall 18 to enable the switches to be moved up and down relative to the cams 54 and 58, as desired. This is only to assure that the limit switches will be opened and closed once during each cam revolution.

The cam drive shaft 66 extends from a gear box 88 which is connected to an electrical motor 90, on the opposite end of which is an electric brake 92.

A commercially-available subtraction counter 94 is located in a control box 96. The counter 94 can be set to any predetermined number which represent the number of strokes desired for the gate 26. During each revolution of the cam 68 and through each reciprocation of the gate 26, the limit switch 78 is opened and closed to pulse the counter 94 and reduce by one digit the number set on it. When the counter reaches zero, it opens a set of contacts which are in parallel with the contacts of the limit switch 70. When the counter contacts open, the motor 90 continues to run through the contacts of the limit switch 70 until those contacts open as the cam 64 reaches a predetermined position with respect to the roller 76 and the feeler arm 74. At that time, the motor 90 is deenergized and the brake 92 is simultaneously energized to immediately stop rotation of the cams 64 and 68 and oscillation of the rod 62. The gate 26 then immediately stops in the closed position.

The contacts of the bin switch 34 are in series with the counter contacts and, if the bin empties, these contacts open to again cause the motor to shut off when the contacts of the limit switch 70 open on the next revolution of the cam 64. The motor 90 then shuts off even though the counter has not counted out, but counting can resume when the bin is filled.

Figure 4:
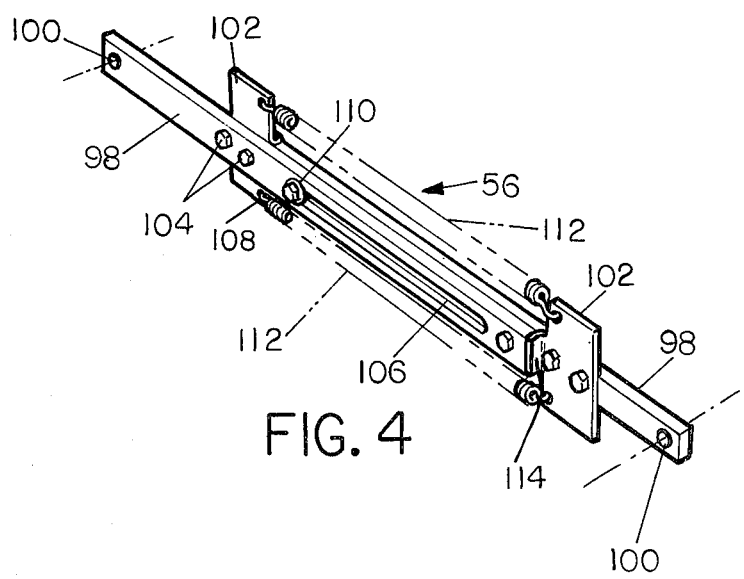
FIG. 4 is a view in perspective of a yieldable linkage employed in the drive mechanism for the gate.

On occasion, foreign objects of some size are mixed in with the supplement or other particulate material. For that reason, the yieldable link 56 is employed so that if the gate 26 encounters an object as it is closing the discharge opening 24, it will stop and the link 56 will stretch a distance equal to the stroke of the line 56, if necessary. As shown in FIG. 4, the link 56 is made of only a few components and is much less expensive than those heretofore employed, such as is shown in the aforementioned U.S. Pat. No. 3,184,108. The link 56 includes two identical bars 98 of plastic material, such as Marlex. These have end holes 100 for being connected to the cam 64 and the stroke control plate 54 and have brackets 102 affixed to intermediate portions by machine screws 104. The bars 98 also have elongate slots 106 through which is inserted a shoulder bolt 108 having washers 110. Two identical springs 112 connect outer tab portions of the brackets 102 to urge the bars 98 toward one another so that their ends abut flanges 114 of the brackets 102.

If the gate is stopped, the springs 112 will yield to enable the bars 98 to move away from one another until the bolt 108 engages the opposite ends of the slots 106, if necessary. The linkage 56 will yield in this manner as long as the motor 90 continues to operate and as long as the obstruction remains in the discharge opening 24 in the path of the gate 26.

It will be seen that the yieldable line 56 is only made of three inexpensive different parts and yet functions equally well with much more expensive yieldable links heretofore employed with metering devices of this nature.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for metering particulate material and transferring it to another location, said apparatus comprising a bin having a discharge opening in a bottom portion thereof, a gate movable back and forth across the discharge opening to open and close it, and means for moving said gate comprising link means connected to said gate, a pivotable rod connected to said link means, a yieldable link, means connecting one end of said yieldable link with said pivotable rod, a first cam pivotally connected to the other end of said yieldable link, means for rotating said first cam to reciprocate said yieldable link, a limit switch operated by said first cam and effective to cause said drive means to stop said gate only in a closed position with respect to said discharge opening, a second cam located near said first cam but spaced therefrom, a second limit switch operated by said second cam and open and closed once during each revolution of said second cam, and a counting device which is pulsed one digit for each opening and closing of said second limit switch, said yieldable link comprising a pair of substantially identical bars having longitudinally-extending slots, a fastener extending through both of said slots with said bars being in contiguous relationship, two substantially identical brackets, one of said brackets being affixed to each of said bars and having outwardly-extending tabs, springs connecting said bars for urging said bars toward one another, each of said brackets having a flange in contact with the other bar when said gate is moved normally across said discharge opening.

2. Metering apparatus according to claim 1 characterized by said counting device having a set of contacts in parallel with contacts of the first limit switch with the counting device contacts being opened when the counting device has been pulsed a predetermined number by said second limit switch, whereby said cam rotating means is stopped when said counting device has been pulsed the predetermined number and said gate is in the closed position.

3. Apparatus for metering particulate material and transferring it to another location, said apparatus comprising a bin having a discharge opening in a bottom portion thereof, a gate movable back and forth across said discharge opening to open and close it, and means for moving said gate comprising a yieldable link having two plastic bars with longitudinally-extending slots, a fastener extending through both of said slots with said bars being in substantially contiguous relationship, a bracket affixed to each of said bars and having outwardly-extending tabs, springs connecting said tabs for urging said bars toward one another, each of said brackets having a flange in contact with the end of the other bar when said gate is moved normally across said discharge opening.

4. Apparatus according to claim 3 characterized by said bars being substantially identical.

5. Apparatus according to claim 3 characterized by said brackets being substantially identical.

* * * * *